United States Patent [19]

Kalua, Jr.

[11] 3,722,943
[45] Mar. 27, 1973

[54] SAFETY HOOK

[76] Inventor: John Kalua, Jr., 865 White Cottage Road, Angwin, Calif. 94508

[22] Filed: May 12, 1971

[21] Appl. No.: 142,548

[52] U.S. Cl. .............................................. 294/82 R
[51] Int. Cl. .................................................. B66c 1/36
[58] Field of Search ....294/78 R, 82 R, 83; 24/230.5, 24/231, 238, 241

[56] References Cited

UNITED STATES PATENTS

| | | | |
|---|---|---|---|
| 1,956,786 | 5/1934 | Bemis | 294/82 R |
| 2,027,376 | 1/1936 | Grau | 294/82 R |
| 2,196,460 | 4/1940 | Hertel | 294/82 R |
| 3,493,260 | 2/1970 | Smith | 294/83 R |

FOREIGN PATENTS OR APPLICATIONS 764,940   1/1957   Great Britain ...................... 294/82 R

*Primary Examiner*—Evon C. Blunk
*Assistant Examiner*—Johnny D. Cherry
*Attorney*—Harris Zimmerman

[57] ABSTRACT

A hook for use with crane blocks, lifting hoists, and the like, having a safety keeper for closing and locking the hook to prevent inadvertent release of a load. The hook is characterized by a pistol grip and trigger release mechanism included in the shank portion of the hook to facilitate convenient unlocking of the keeper and release of the load without requiring the operator to place his hands in the vicinity of the load bearing portion of the hook.

2 Claims, 4 Drawing Figures

Patented March 27, 1973
3,722,943
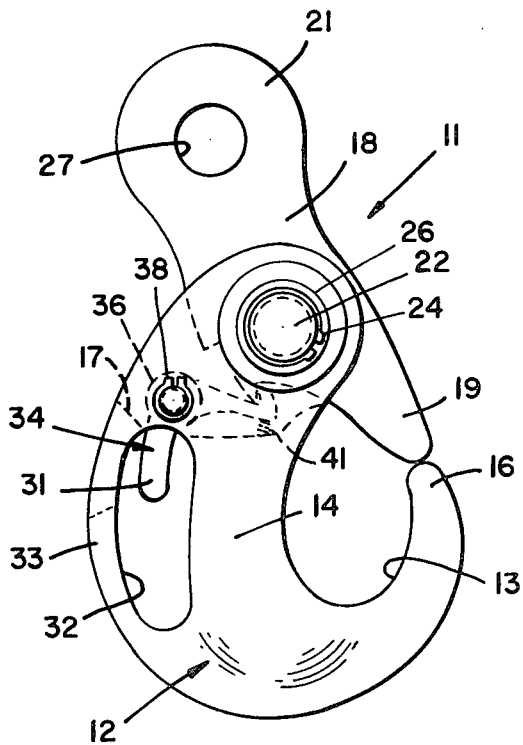
FIG_1
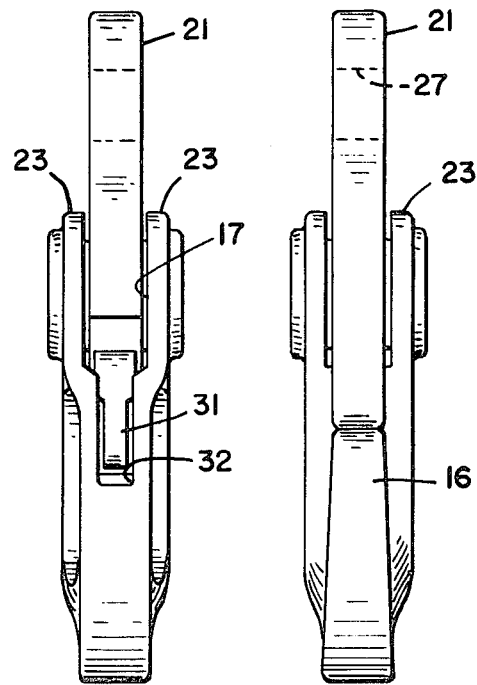
FIG_2  FIG_3
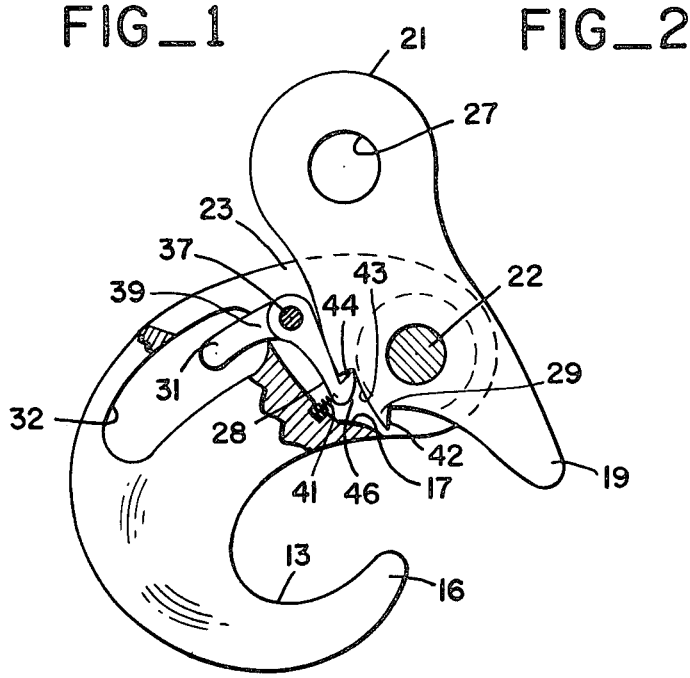
FIG_4
INVENTOR.
JOHN KALUA, JR.
BY
*Harris Zimmerman*
ATTORNEY

SAFETY HOOK

BACKGROUND OF THE INVENTION

Various safety hooks are known for use with crane blocks, lifting hoists, and the like, which are arranged for locking closure to prevent accidental slippage or inadvertent release of a load therefrom. Such hooks generally include a pivotal keeper which is movable from an open position permitting access to the load bearing hook interior, to a locked closed position forming a closed eye. Release of the keeper from its locked position is typically accomplished by depression of a release lever carried by the keeper. This entails placing the operator's hands in the vicinity of the load bearing portion of the hook such that there is an ever present danger of the fingers being entangled with a cable or other rigging of the load during release of the keeper.

SUMMARY OF THE INVENTION

The general object of the present invention is to provide an improved safety hook having a keeper release mechanism which does not involve hazardous placement of the operator's hands in the vicinity of the load bearing portion of the hook during unlocking of the keeper for return to the open position.

Another object of the invention is the provision of a safety hook of the class described which is characterized by a keeper release mechanism in the form of a pistol grip and trigger carried in the shank portion of the hook so as to be protectively isolated from the load bearing portion thereof.

It is a further object of the invention to provide a safety hook of the class described which is of relatively simple design.

In the accomplishment of the foregoing and other objects and advantages, a safety hook in accordance with the present invention generally includes a body including a relatively wide arcuate shank portion with a narrowed load bearing tip portion curving reentrantly upward therefrom in spaced relation thereto. The upper end of the shank portion is slotted to receive a keeper member which is pivoted centrally thereof between the walls of the slot. The keeper member includes a pointed end portion projection outwardly from the shank portion for engagement with the tip portion of the body to define a closed eye, and an opposite end portion projecting upwardly from the shank portion to form an extension thereof and having an eye to facilitate connection to a crane block, lifting hoist, or the like. The keeper member is pivotal between the closed position wherein the pointed portion thereof engages the tip portion of the body, and an open position wherein the pointed portion of the keeper member is displaced from the tip portion of the body. The keeper member is locked in closed position by means of a spring loaded dog pivotally mounted between the walls of the slot for engagement with a tooth of the keeper member in its closed position. The dog includes an end portion in the form of a trigger which depends into a piston grip defining aperture formed in the shank portion of the body, such trigger being depressible against the spring loading of the dog to release the keeper member for pivotal movement to its open position.

BRIEF DESCRIPTION OF THE DRAWINGS

FIG. 1 is a side elevational view of a safety hook in accordance with the present invention, a keeper of the hook being depicted in locked closed position;

FIG. 2 is a rear end view of the safety hook;

FIG. 3 is a front end view of the safety hook;

FIG. 4 is a side sectional view taken at a vertical plane through the hook, the keeper being depicted in its open position.

DETAILED DESCRIPTION OF A PREFERRED EMBODIMENT OF THE INVENTION

Referring now to the drawing in detail, a safety hook 11 in accordance with the present invention will be seen to include a generally ovate body 12 having an arcuate notch 13 in its forward end so as to define a relatively wide arcuate shank portion 14 having a narrowed load bearing arcuate tip portion 16 curving reentrantly upward from the base thereof and forwardly spaced therefrom. The notch 13 serves to receive a cable or other rigging of a load to which the tip portion 16 is introduced.

The upper end of shank portion 14 is formed with a slot 17 which receives an elongated keeper member 18 having a pointed end portion 19 projecting forwardly and downwardly from the shank portion for engagement with tip portion 16, and an opposite end portion 21 projecting upwardly from the shank portion so as to form an extension thereof. The keeper member is pivotally connected to the shank portion as by means of a pivot pin 22 transversely traversing the central portion of the member and opposite side walls 23 of slot 17. The pin is preferably secured in position by means of a pair of snap rings 24 engaging circumferential grooves adjacent its opposite ends and bearing against a pair of washers 26 carried upon the pin in interposed relation between the rings and exterior sides of the shank portion. Thus, the keeper member 18 may be pivoted relative to body 12 between a closed position wherein pointed end portion 19 engages tip portion 16 to form with notch 13 a closed eye, as shown in FIG. 1, and an open position wherein the pointed end portion is displaced forwardly from the tip portion, as shown in FIG. 4. The shank extending end portion 21 of keeper member 18 is formed with an eye 27 to facilitate securance of the overall safety hook 11 to a lifting hoist, crane block or the like.

Locking of the keeper member in closed position is accomplished by means of a dog 28 carried in slot 17 for locking engagement with a tooth 29 of the keeper member 18 when same is in closed position. In accordance with the particularly salient aspects of the invention, the lock dog 28 is associated with a release trigger 31 which depends into an elongated aperture 32 formed in shank portion 14 of body 12 so as to define a pistol grip 33 with the rear edge thereof. More particularly, the dog and trigger are provided as substantially right-angularly related radial arms of a crank 34 having a central hub 36 pivotally mounted in slot 17 at a position rearwardly and downwardly displaced from keeper member pivot pin 22. Mounting of the crank is preferably accomplished by means of oppositely laterally projecting pivot pins 37 formed integrally with the hub and traversing the slot side walls 23 for receipt of snap rings 38 in circumferential grooves adjacent the outer ends of the pins. The hub substantially directly overlies the aperture 32 so that the trigger 31 may depend substantially vertically thereinto through a communicating opening 39 formed between the base of the slot and the aperture. With the trigger so positioned the dog projects substantially directly forward through the slot. Resilient retention of the crank in the foregoing position is preferably facilitated by at least one compression spring 41 acting between the base of the slot and the dog at a position forwardly spaced from the hub 36.

The tooth 29 is formed in the trailing edge of keeper member 18 substantially adjacent the central intersection between pointed end portion 19 and opposite end portion 21. The leading edge 42 of tooth 29 is preferably reentrantly notched so as to extend in the forward direction. The trailing edge 43 of the tooth is gradually curved rearwardly and inwardly of the member to terminate abruptly in the leading edge of a stop step 44. The trailing edge 43 defines a cam surface for interacting with a curved leading end cam surface 46 of dog 28 to pivot same downwardly against the loading of springs 41 when the keeper member is pivoted towards closed position.

With the safety hook 11 provided in the manner physically described hereinbefore, and the keeper member 18 locked in closed position, as shown in FIG. 1, the grip 33 may be grasped by a hand of an operator with the fingers extending through aperture 32. The trigger 34 may be finger depressed rearwardly to disengage dog 28 from tooth 29 and thereby release the keeper member for pivotal movement relative to the body 12. With the trigger depressed and the hand grasping the grip 33, the body may be readily pivoted to cause the keeper to assume the open position relative to the tip portion 16 of the body depicted in FIG. 4, at which time the dog engages the stop step 44. The tip portion 16 and notch 13 are thereby exposed for maneuvering into snapping engagement with a load under the control of the operator grasping the grip 33. Thereafter, trigger 31 is released and the body and keeper member are pivoted relative to each other to closed position, such pivotal movement being effected with the operator's hand still grasping the grip. The cam surface 46 of dog 28 in riding over the trailing edge cam surface 43 of tooth 29 effects pivotal depression of the dog. Upon encountering the leading edge 42 of the tooth when the keeper is in closed position, however, the dog is urged by springs 41 into positive locking engagement with the tooth, thereby locking the keeper member in closed position until such time as trigger 31 is again depressed. It is particularly important to note that during the entire maneuvering procedure of the hook, the operator's hand in grasping grip 33 is in a substantially protected position isolated from the load bearing portion of the hook to minimize the danger of accident.

I claim:

1. A safety hook comprising a body including a shank portion with a narrowed load bearing tip portion curving reentrantly upward therefrom in forward spaced relation thereto, a keeper member mounted at the upper end of said shank portion for pivotal movement relative thereto, said keeper member having a pointed end portion projecting forwardly and downwardly from said shank portion for engagement with said tip portion of said body and an opposite end portion projecting upwardly from said shank portion to define an extension thereof, said keeper member being pivotal between a closed position wherein said pointed end portion engages said tip portion and an open position wherein said pointed end portion is forwardly displaced from said tip portion, locking means carried by said shank portion for locking said keeper member in said closed position, said shank portion having a slot in its upper end and a central elongated aperture upwardly communicating with said slot, said aperture defining a pistol grip configuration, release means associated with said locking means for selectively releasing said keeper member for pivotal movement, said release means including a release trigger positioned adjacent said pistol grip configuration, said release trigger being disposed to depend into said aperture, said keeper member pivotally mounted at a position intermediate its length within said slot between the opposite side walls thereof, said keeper member having a tooth in its rear edge adjacent the pivotal mounting thereof, and said locking means and release means comprising a crank having first and second angularly related radial arms, said crank pivotally mounted between said side walls of said slot at a position rearwardly and downwardly displaced from said pivotal mounting of said keeper member and in overlying relation to said aperture, said first arm defining a dog engageable with said tooth in said closed position of said keeper member, said second arm defining said release trigger and depending into said aperture, and spring loading means acting between the base of said slot and said dog to resiliently urge same into engagement with said tooth.

2. A safety hook according to claim 1, further defined by said tooth having a reentrantly notched leading edge and a gradually rearwardly and inwardly curved trailing edge terminating abruptly in the leading edge of a stop step engageable with said dog in said open position of said keeper member, said dog having a curved leading end engageable with said trailing edge of said first tooth during pivotal movement of said keeper member towards said closed position to urge said dog against said spring loading means.

* * * * *